(12) United States Patent
Lin

(10) Patent No.: US 10,799,730 B2
(45) Date of Patent: Oct. 13, 2020

(54) FILTERING DEVICE

(71) Applicants: Jing-Jyr Lin, Taoyuan County (TW); Chia-Chi Lin, Taoyuan County (TW)

(72) Inventor: Chia-Chi Lin, Taoyuan County (TW)

(73) Assignees: Jing-Jyr Lin, Taoyuan County (TW); Chia-Chi Lin, Taoyuan County (TW)

( * ) Notice: Subject to any disclaimer, the term of this patent is extended or adjusted under 35 U.S.C. 154(b) by 312 days.

(21) Appl. No.: 15/034,616

(22) PCT Filed: Nov. 7, 2014

(86) PCT No.: PCT/CN2014/000978
§ 371 (c)(1),
(2) Date: May 5, 2016

(87) PCT Pub. No.: WO2015/066967
PCT Pub. Date: May 14, 2015

(65) Prior Publication Data
US 2016/0296773 A1     Oct. 13, 2016

(30) Foreign Application Priority Data

Nov. 7, 2013 (CN) .......................... 2013 1 0548214
Nov. 7, 2013 (CN) ...................... 2013 2 0704963 U

(51) Int. Cl.
*A62B 23/02* (2006.01)
*A41D 13/11* (2006.01)
*B01D 46/52* (2006.01)
*A62B 18/02* (2006.01)
*B01D 46/00* (2006.01)

(52) U.S. Cl.
CPC ........ *A62B 23/025* (2013.01); *A41D 13/1107* (2013.01); *A41D 13/1138* (2013.01); *A62B 18/025* (2013.01); *B01D 46/0032* (2013.01); *B01D 46/521* (2013.01); *B01D 2275/10* (2013.01)

(58) Field of Classification Search
CPC ....... A62B 23/00; A62B 23/02; A62B 23/025; A62B 18/00; A62B 18/02; A62B 18/025; A41D 13/11; A41D 13/1107; A41D 13/1138; B01D 46/52; B01D 46/521; B01D 46/522
USPC ..... 128/863, 206.12, 206.17, 206.19, 206.21
See application file for complete search history.

(56) References Cited

U.S. PATENT DOCUMENTS

| 6,161,540 A * | 12/2000 | Fecteau | A62B 23/00 |
| | | | 128/205.27 |
| 6,403,197 B1 * | 6/2002 | Skov | A62B 23/025 |
| | | | 128/205.29 |
| 2010/0154805 A1 * | 6/2010 | Duffy | A62B 23/025 |
| | | | 128/863 |
| 2010/0154806 A1 * | 6/2010 | Duffy | A41D 13/1115 |
| | | | 128/863 |

(Continued)

*Primary Examiner* — Keri J Nelson
(74) *Attorney, Agent, or Firm* — Rosenberg, Klein & Lee

(57) ABSTRACT

A filtering device is revealed. The filtering device includes a mask body and a pleated layer. The pleated layer is arranged with a plurality of pleats and is set on the mask body. The surface area of the pleated layer is larger than the surface area of the mask body. Thus the filtration area of the filtering device is increased effectively. The filter effect and the air permeability of the filtering device are further improved.

20 Claims, 17 Drawing Sheets

(56) References Cited

U.S. PATENT DOCUMENTS

| | | | | |
|---|---|---|---|---|
| 2011/0036353 A1* | 2/2011 | Kern | .................... | A62B 23/025 |
| | | | | 128/206.16 |
| 2012/0017911 A1* | 1/2012 | Choi | .................... | A62B 18/025 |
| | | | | 128/206.19 |
| 2013/0291876 A1* | 11/2013 | Angadjivand | ....... | A62B 23/025 |
| | | | | 128/863 |

* cited by examiner

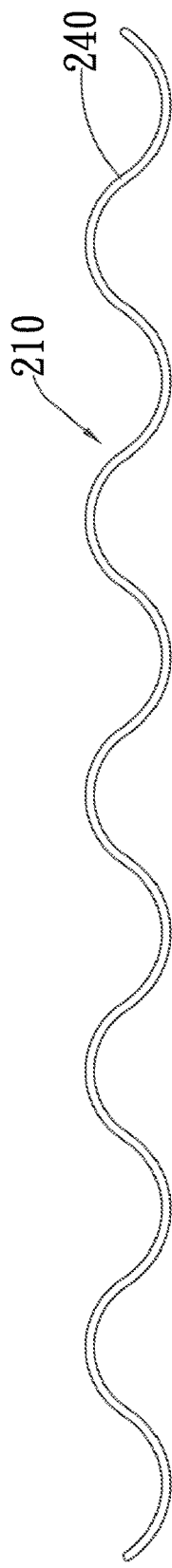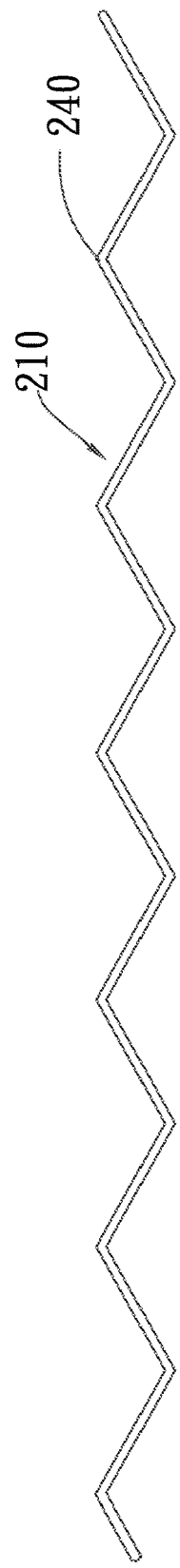
FIG. 3A
FIG. 3B

FILTERING DEVICE

BACKGROUND OF THE INVENTION

Field of the Invention

The present invention relates to a filtering device, especially to a filtering device with good air permeability and filer effect.

Descriptions of Related Art

Filtering devices such as masks have been one of our daily essentials. In these days, air pollution is getting serious due to large amount of waste gases from industrial processes or vehicles. The air pollution causes great impact on our health and environment. Thus the mask is essential for motorcycle riders. Moreover, the medical mask is indispensable for prevention of infectious diseases. For example, there was an outbreak of SARS (severe acute respiratory syndrome) and bird flu, both are common infectious viruses, several years ago. The viruses have caused lots of death so that the masks were in short at that time.

There are versatile kinds of masks including paper masks, surgical masks, N95 masks, activated carbon masks, etc. The masks are designed for protective purposes and used for preventing harmful visible/invisible substances from entering our bodies.

The filter efficiency of the common masks depends on how effective the mask filters out small particles/dust. The particles/dust with small size enter our alveoli directly and have great impact on human health. A general anti-dust mask moves out small particles by mechanical filtration. When particles/dust pass through the mask, large particles are blocked in layers of gauze. Yet some fine particles/dust can penetrate through the layers of gauze and enter our respiratory system. Nowadays the filter medium used in some kinds of anti-dust masks is electrostatic fiber that effectively absorbs the particles/dust. Thus the small particles/dust are blocked in the mask so as to move out the particles/dust.

A good mask should satisfy the following conditions. First the mask is fit to the user's face comfortably and perfectly. The mask has good filter efficiency and low resistance to breathing. The filter medium used in the mask can be general fabric, animal hair, non-woven cloth, etc.

A common filter medium of the mask is fabric. For high efficiency of dust removal, the mask is designed to have increased thickness and density of the fabric (the filter medium). Yet the breathing resistance is increased and the air permeability is lowered due to the increased thickness and density of the filter medium. Thus the user that wears the mask may feel uncomfortable due to breathing problems caused by the filter medium.

Thus there is room for improvement and a need to provide a filtering device that increases filtration area and air permeability by a pleated layer with a plurality of pleats to overcome shortcomings of the masks available now mentioned above. The filtering device of the present invention has the design that prevents not only deformation of the pleats but also reduction of the air permeability.

SUMMARY OF THE INVENTION

Therefore it is a primary object of the present invention to provide a filtering device in which a pleated layer with a plurality of pleats is disposed on a mask body. The surface area of the pleated layer is larger than the surface area of the mask body so as to increase filtration area of the filtering device and further improve filter capacity of the filtering device. Moreover, the pressure difference across the filtering device is reduced and the air permeability of the filtering device is dramatically increased. Thus the wearing comfort is greatly improved.

It is another object of the present invention to provide a filtering device that includes a pleated layer being three-dimensional (3D) and disposed on a mask body. The mask body is used to protect the pleated layer and prevent deformation of the pleated layer. Thus the filter effect and air permeability of the filtering device will not be affected by the deformation of the pleated layer.

It is a further object of the present invention to provide a filtering device that includes a shaping portion around a pleated layer and used for fixing pleats on the pleated layer to avoid deformation of the pleats on the pleated layer. Thus the filter effect and air permeability of the filtering device will not be reduced due to deformation of the pleats on the pleated layer.

It is a further object of the present invention to provide pleated fabric used in a filtering device and formed by a pleated sheet and a fixing sheet. A plurality of pleats on the pleated sheet are connected to the fixing sheet by a plurality of connection portions. Then the pleated fabric are pressed to form the filtering device. Thus not only the deformation of the pleated layer and the pleats can be avoided, the filter effect and air permeability of the filtering device will also not be reduced. The filtering device has simple structure and simplified production processes.

In order to achieve the above objects, a filtering device according to the present invention includes a mask body being 3D and a pleated layer disposed on the mask body. The pleated layer is 3D and has a plurality of pleats. The surface area of the pleated layer is larger than the surface area of the mask body.

In order to solve the technical problems mentioned above and achieve the above objects, the filtering device of the present invention further has the following features.

The cross section of the pleats of the pleated layer can be continuous waves, discontinuous waves, zigzag form, or irregular. The pleated layer carries electrostatic charges.

The pleated layer of the filtering device includes a plurality of pleated sheets each of which includes the pleats, at least one joining edge, and at least one formed sheet. The joining edge of each pleated sheet is connected to the joining edge of the adjacent pleated sheet.

The joining edge can be curved or linear.

The shape of the pleated layer is corresponding to and matched the shape of the mask body. The mask body includes a first shaping layer and the pleated layer is disposed on one side of the first shaping layer.

The filtering device further includes a protective layer that is disposed on the other side of the first shaping layer and is spaced apart from the pleated layer.

The filtering device further comprises a second shaping layer that is disposed on one side of the pleated layer and is spaced apart from the first shaping layer.

The pleated layer of the filtering device includes at least one formed sheet.

A first connection portion is disposed around the mask body while a shaping portion is disposed around the pleated layer. The first connection portion and the shaping portion are connected to each other.

The filtering device further comprises a shaping layer disposed on the pleated layer while a second connection portion is disposed around the shaping layer. The second connection portion can be connected to the first connection portion and/or the shaping portion.

The filtering device further includes at least one protective layer while a third connection portion is disposed around the protective layer. The third connection portion is connected to the first connection portion and/or the shaping portion.

The pleated layer further includes at least one shaping portion that is disposed on the pleats located within the circumference of the pleated layer and used for fixing the pleats.

In order to solve the technical problems mentioned above and achieve the above objects, a filtering device of the present invention includes a mask body and a pleated layer. The pleated layer is disposed on the mask body and includes a plurality of pleats and a shaping portion used for fixing the pleats. The surface area of the pleated layer is larger than the surface area of the mask body.

In order to solve the technical problems mentioned above and achieve the above objects, a filtering device of the present invention includes a fixing layer being 3D and a pleated layer. The pleated layer is 3D and disposed on the fixing layer and has a plurality of pleats. At least one connection portion is formed between the fixing layer and the pleats located within the circumference of the pleated layer. The fixing layer fixed on the pleated layer is used to fix the pleats. The surface area of the pleated layer is larger than the surface area of the fixing layer.

In order to solve the technical problems mentioned above and achieve the above objects, the filtering device of the present invention further has the following features.

The fixing layer and the pleated layer are produced by pressing a pleated fabric.

The fixing layer and the pleated layer are produced by pressing at least two pieces of pleated fabric. Each pleated fabric includes at least one joining edge and the joining edge of each pleated fabric is connected to the joining edge of the adjacent pleated fabric.

The pleated fabric includes a pleated sheet with the pleats and a fixing sheet disposed on the pleated sheet. At least one connection portion is formed between the fixing sheet and the pleats located within the circumference of the pleated sheet. The fixing sheet is used for fixing the pleats.

In order to solve the technical problems mentioned above and achieve the above objects, a pleated fabric used in a filtering device of the present invention includes a pleated sheet with a plurality of pleats and a fixing sheet disposed on the pleated sheet. At least one connection portion is formed between the fixing sheet and the pleats located within the circumference of the pleated sheet. The fixing sheet is used for fixing the pleats.

In order to solve the technical problems mentioned above and achieve the above objects, the pleated fabric of the present invention further has the following features.

In the pleated fabric used in the filtering device, the connection portion is located on a depression between two adjacent pleats.

The filtering device of the present invention has the following advantages:

1. The pleated layer with a plurality of pleats is disposed on the mask body. The surface area of the pleated layer is larger than the surface area of the mask body. Thus the filtration area of the filtering device is increased, and the filter capacity of the filtering device is improved. Moreover, the pressure difference across the filtering device is reduced and the air permeability of the filtering device is dramatically increased. Thus the filtering device provides the user with greater comfort when the user wears the filtering device.

2. The pleated layer of the filtering device is in the 3D shape and disposed on the mask body. The mask body protects the pleated layer from damages and prevents deformation of the plated layer so as to avoid reduction of the filter effect and air permeability of the filtering device.

3. The shaping portion around the pleated layer of the filtering device is used to shape and fix the pleats of the pleated layer. Thus the pleats of the pleated layer will not be deformed. The filter effect and the air permeability of the filtering device will also not be affected.

4. The pleated fabric used in the filtering device includes a fixing sheet and a pleated sheet. The plurality of pleats of the pleated sheet are connected to the fixing sheet by a plurality of connection portions. Then the pleated fabric is pressed to form the filtering device. Thus the deformation of the pleated layer and the pleats can be avoided. The filter effect and the air permeability of the filtering device will not be further reduced. Moreover, the filtering device has the simpler structure and the simplified production processes.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 3A is a schematic drawing showing a first pleated sheet of the $2^{nd}$ embodiment according to the present invention;

FIG. 3B is a schematic drawing showing a first pleated sheet of the $3^{rd}$ embodiment according to the present invention;

DETAILED DESCRIPTION OF THE PREFERRED EMBODIMENT

Figure 1:
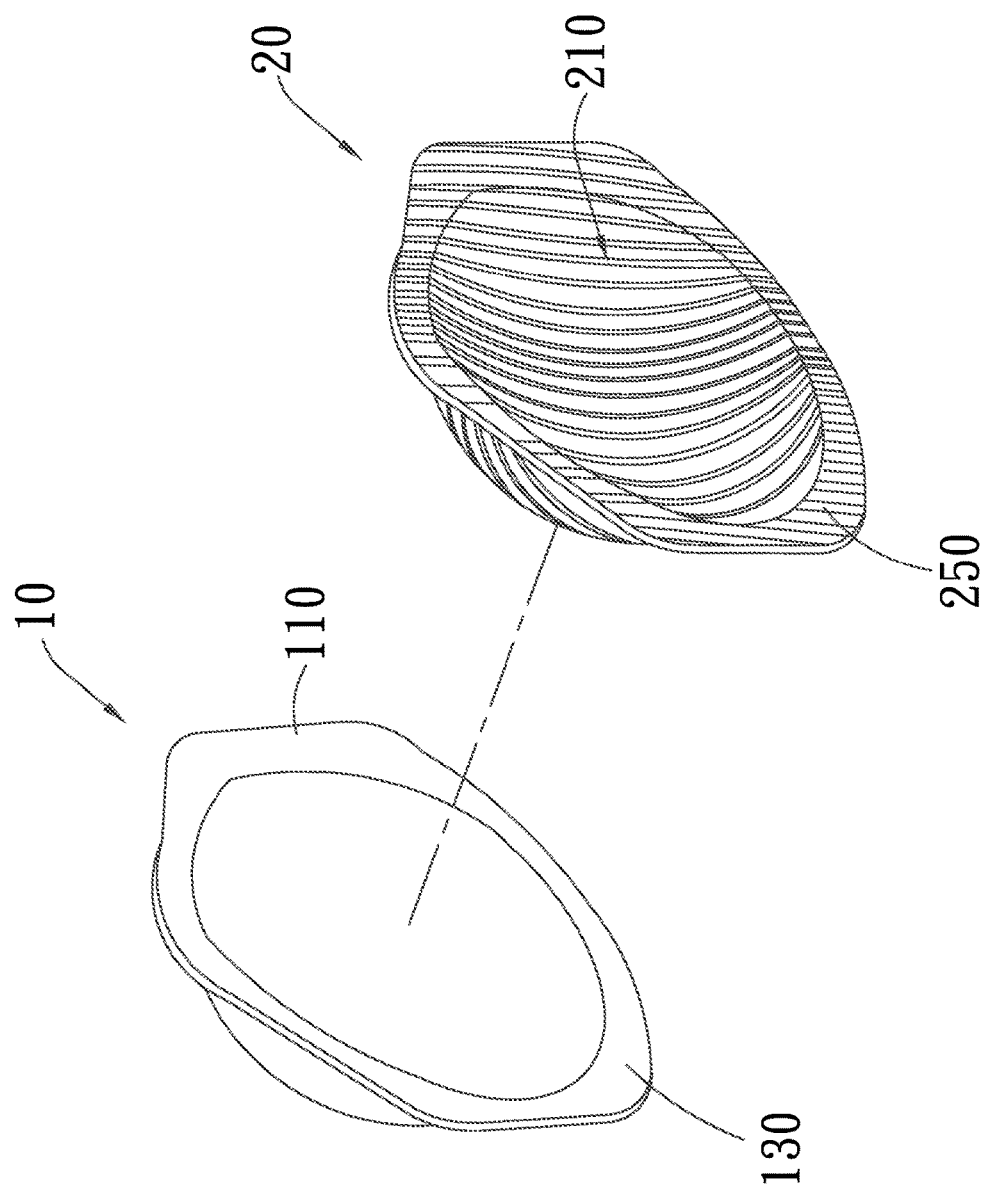
FIG. 1 is a schematic drawing showing the $1^{st}$ embodiment according to the present invention.

Refer to FIG. 1, a filtering device 1 of the 1st embodiment according to the present invention includes a mask body 10 and a pleated layer 20. The pleated layer 20 having a plurality of pleats 210 is disposed on the mask body 10. The mask body 10 is three-dimensional (3D) and so is the pleated layer 20. As shown in FIG. 1, both the mask body 10 and the pleated layer 20 are cup-shaped. The shape (cup-shaped) of the pleated layer 20 matches the shape (cup-shaped) of the mask body 10. Before being assembled, the mask body 10 and the pleated layer 20 of the present invention are in 3D shape.

Due to the pleats 210, the surface area of the pleated layer 20 of the filtering device 1 is larger than the surface area of the mask body 10. Thus the pressure difference between the inner side and the outer side of the filtering device 1 can be reduced and the filtering device 1 has high air permeability. Therefore the problem of sultriness and difficulty breathing can be avoided while users wearing the filtering device 1 and the filtering device 1 is more comfortable for users to wear. Moreover, filtration area of the filtering device 1 is increased due to the surface area of the pleated layer 20 that is larger than the surface area of the mask body 10. The filter efficiency of the filtering device 1 is further improved.

In this embodiment, the mask body 10 includes a cup-shaped first shaping layer 110. The pleated layer 20 is set on an inner side of the first shaping layer 110. The shape of the pleated layer 20 is fixed by the first shaping layer 110 so that the pleated layer 20 is kept in the 3D shape. The pleated layer 20 is used to filter air flowing from the outer side of the filtering device 1 to the inner side of the filtering device 1 and is made from a kind of filter medium. Thus the strength of the pleated layer 20 is insufficient and the pleated layer 20 is easy to get deformed due to an external force. Yet the pleated layer 20 in this embodiment is supported and protected by the first shaping layer 110. The deformation of the pleated layer 20 in this embodiment can be avoided.

A first connection portion 130 is disposed around the first shaping layer 110 of the mask body 10. A shaping portion 250 is disposed around the pleated layer 20 and used for fixing and shaping the pleats 210 so as to avoid deformation of the pleats 210. When the pleated layer 20 is set on the first shaping layer 110, the first connection portion 130 and the shaping portion 250 are connected to each other by rolling pressing or direct pressing with the energy of gravity, ultrasonic waves or heat. Besides the pressing, the first connection portion 130 and the shaping portion 250 can also be connected to each other by glue or machine sewing. Thus the pleats 210 of the pleated layer 20 will not be deformed under the influence of the deformed mask body 10 when the user wears the filtering device 1. Therefore the filter efficiency and air permeability of the filtering device 1 are not affected.

In this embodiment, the mask body 10 and the pleated layer 20 are in the 3D shape in advance before being assembled. The mask body 10 and the pleated layer 20 can also be in a flat form before being assembled. Then the mask body 10 and the pleated layer 20 are stacked and mounted into a three-dimensional mold to be directly pressed or rolling-pressed with energy of ultrasonic waves, gravity or heat. Thus the mask body 10 and the pleated layer 20 are shaped into the 3D form simultaneously. The first connection portion 130 and the shaping portion 250 are formed around the first shaping layer 110 and the pleated layer 20 respectively at the same time. The first connection portion 130 and the shaping portion 250 are connected to each other.

Moreover, the pleated layer 20 of this embodiment is processed to have electrostatic charges. The pleated layer 20 with the electrostatic charges static clings the small particles/dust passed through the outer side of the filtering device 1 into the inner side of the filtering device 1 when the user wears the filtering device 1. Thus the filter efficiency of the filtering device 1 has been improved.

Figure 2B:
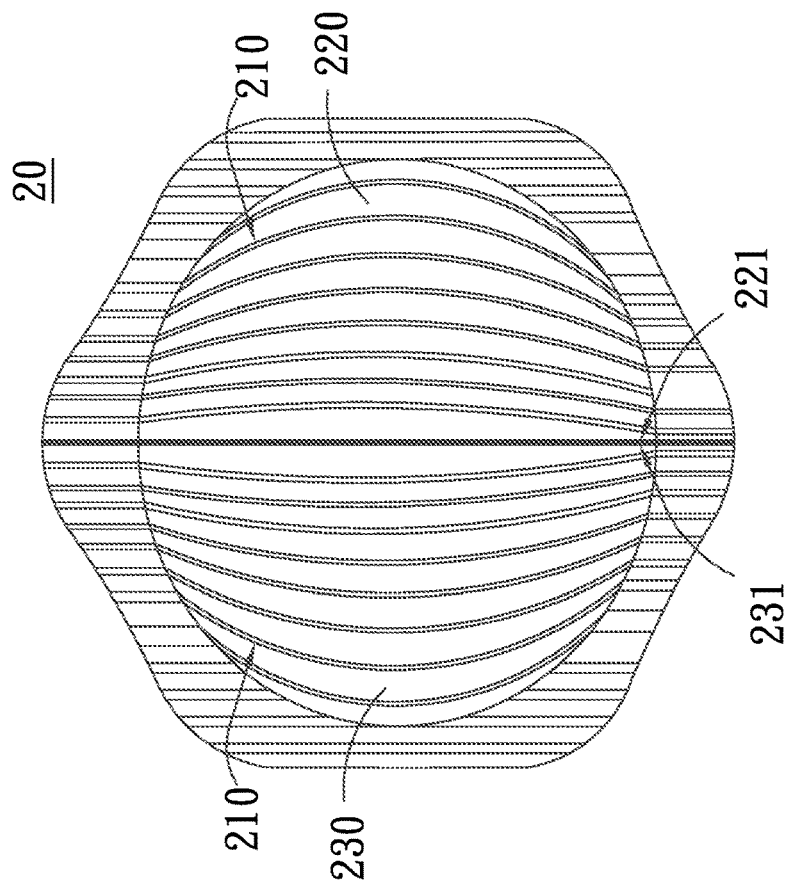
FIG. 2B is another schematic drawing showing the pleated layer of the $2^{nd}$ embodiment according to the present invention.
Figure 2A:
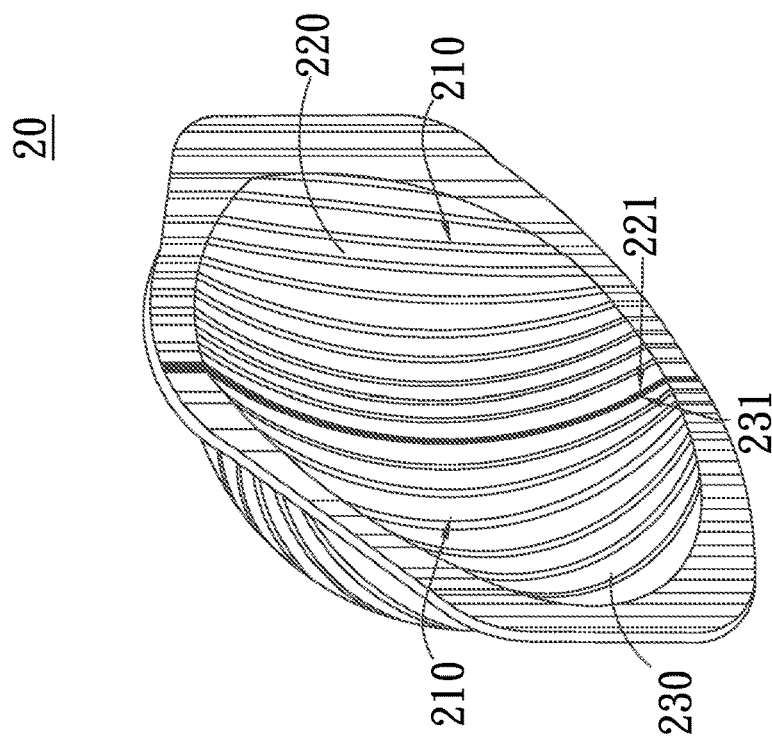
FIG. 2A is a schematic drawing showing a pleated layer of the $2^{nd}$ embodiment according to the present invention.

Refer to FIG. 2A and FIG. 2B, the 2nd embodiment is revealed. As shown in the figure, the pleated layer 20 including a first pleated sheet 220 and a second pleated sheet 230 of this embodiment is different from the pleated layer 20 produced by the single pressed pleated sheet in the above embodiment. Both the first pleated sheet 220 and the second pleated sheet 230 include a plurality of pleats 210. The first pleated sheet 220 includes a first joining edge 221 while the second pleated sheet 230 has a second joining edge 231. The first joining edge 221 of the first pleated sheet 220 and the second joining edge 231 of the second pleated sheet 230 are connected to each other. Both the first joining edge 221 and the second joining edge 231 are connected to the pleats 210 for fixing the pleats 210. Thus the pleats 210 will not get deformed due to extension when the first pleated sheet 220 and the second pleated sheet 230 have been extended. In this embodiment, the first joining edge 221 and the second joining edge 231 are curved. They can also be linear. The shape of the first joining edge 221 and the second joining edge 231 are not limited.

After being extended, the first pleated sheet 220 and the second pleated sheet 230 are set on a three-dimensional (3D) mold and then are pressed to form the 3D pleated layer 20. The shape of the pleated layer 20 is corresponding to and matched the shape of the mask body 10.

Figure 3C:
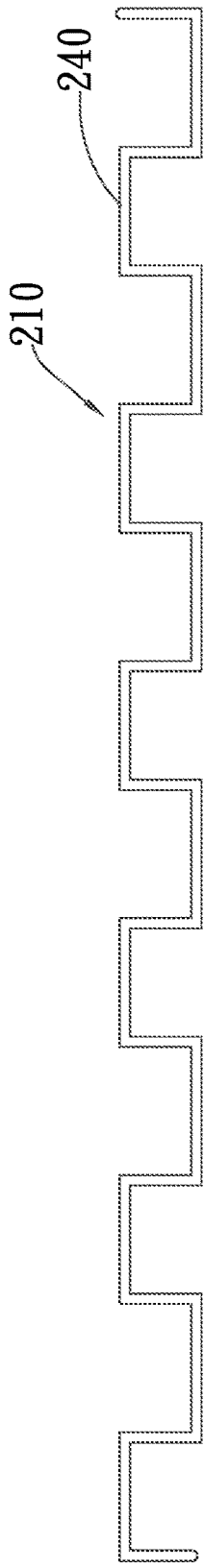
FIG. 3C is a schematic drawing showing a first pleated sheet of the $4^{th}$ embodiment according to the present invention.
Figure 3D:
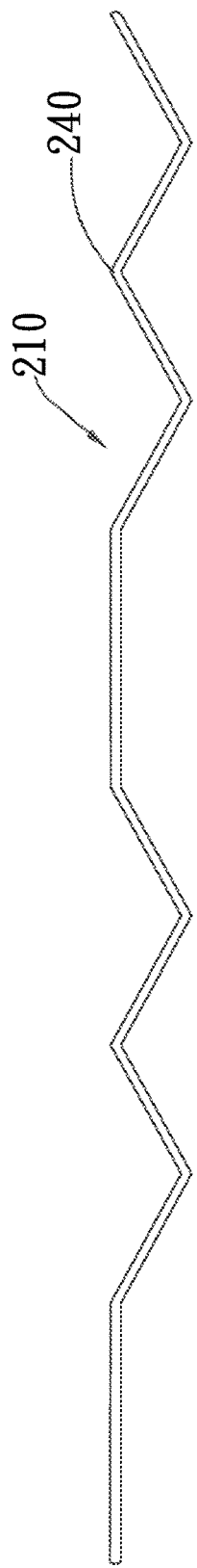
FIG. 3D is a schematic drawing showing a first pleated sheet of the $5^{th}$ embodiment according to the present invention.

Formed sheets 240 are pleated to get pleats 210 and further form the first pleated sheet 220 and the second pleated sheet 230 respectively. The formed sheets 240 is made from non-woven fabric, net fabric or other materials. Take the first pleated sheet 220 as an example. Refer from FIG. 3A to FIG. 3D, cross sections of the first pleated sheet 220 are revealed. Each formed sheet 240 is pleated to form the pleats 210 and further form the first pleated sheet 220. The shape of the pleats 210 can be continuous waves (FIG. 3A), continuous zigzag form (FIG. 3B and FIG. 3C), discontinuous zigzag form (FIG. 3D), discontinuous waves or irregular. The shape of the cross section of the pleats 210 is not limited.

Figure 4:
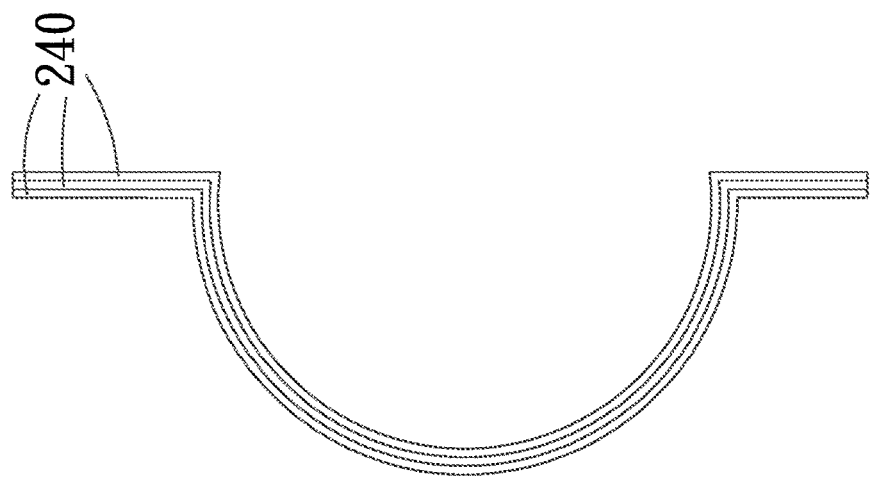
FIG. 4 is a cross sectional view of a pleated layer of the $6^{th}$ embodiment according to the present invention.
Figure 5:
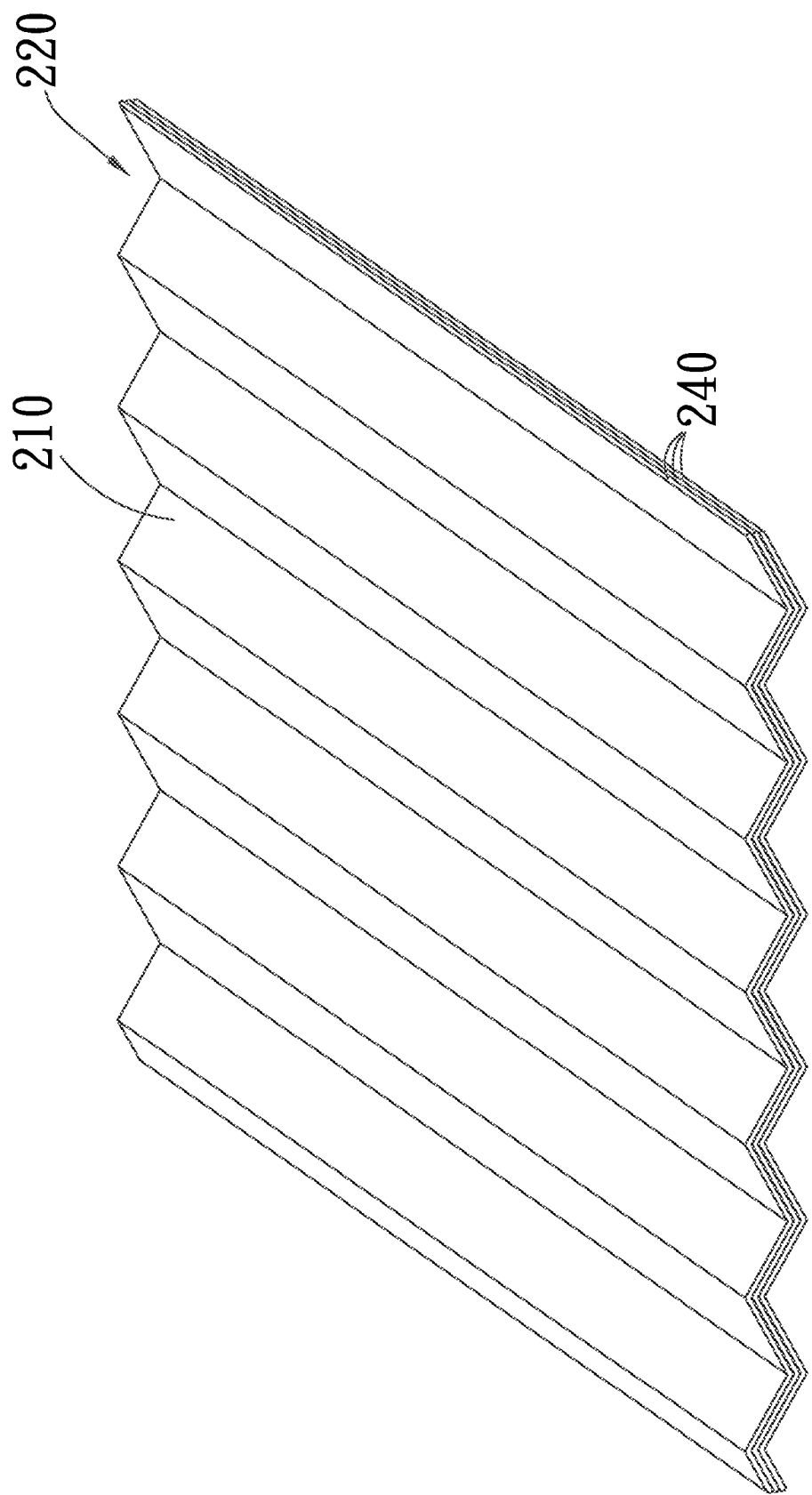
FIG. 5 is a schematic drawing showing a first pleated sheet of the $6^{th}$ embodiment according to the present invention.

Refer to FIG. 4 and FIG. 5, a cross section of a pleated layer of the 6th embodiment and a schematic drawing showing the first pleated sheet of the embodiment are revealed. As shown in the figures, the first pleated sheet 220 and the second pleated sheet of the pleated layer 20 of the above embodiment are produced by the single formed sheet 240 respectively. In this embodiment, the first pleated sheet 220 or the second pleated sheet of the pleated layer 20 is formed by stacking a plurality of formed sheets 240. Then the stacked formed sheets 240 are pleated to form pleats 210. The pleats 210 of each formed sheet 240 are also stacked so as to increase the structural strength of the pleats 210 of the first pleated sheet 220 or the second pleated sheet. Thus not only the deformation of the pleats 210 is prevented, the filter effect of the filtering device 1 is also increased. The formed sheet 240 is made from non-woven fabric, net fabric or combinations of soft and hard materials.

Figure 6:
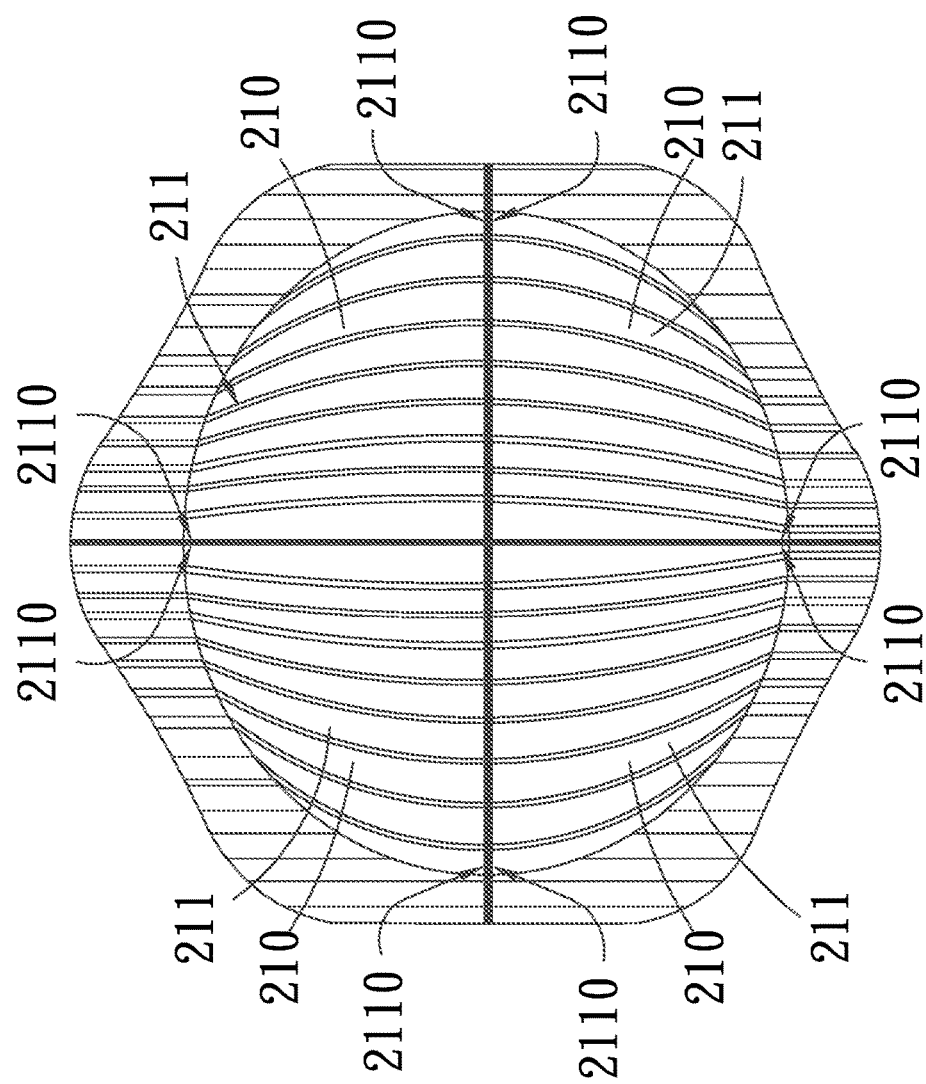
FIG. 6 is a schematic drawing showing a pleated layer of the $7^{th}$ embodiment according to the present invention.

Refer to FIG. 6, the 7$^{th}$ embodiment is disclosed. As shown in the figure, the pleated layer 20 of this embodiment and the pleated layer 20 of the above embodiment is different in that the pleated layer 20 of this embodiment includes at least three pleated sheets 211. Each pleated sheet 211 includes the pleats 210 and at least one joining edge 2110. The joining edge 2110 of each pleated sheet 211 is connected to the joining edge 2110 of the adjacent pleated sheet 211. Then the extended pleated sheets 211 are pressed to form the 3D pleated layer 20.

Figure 7:
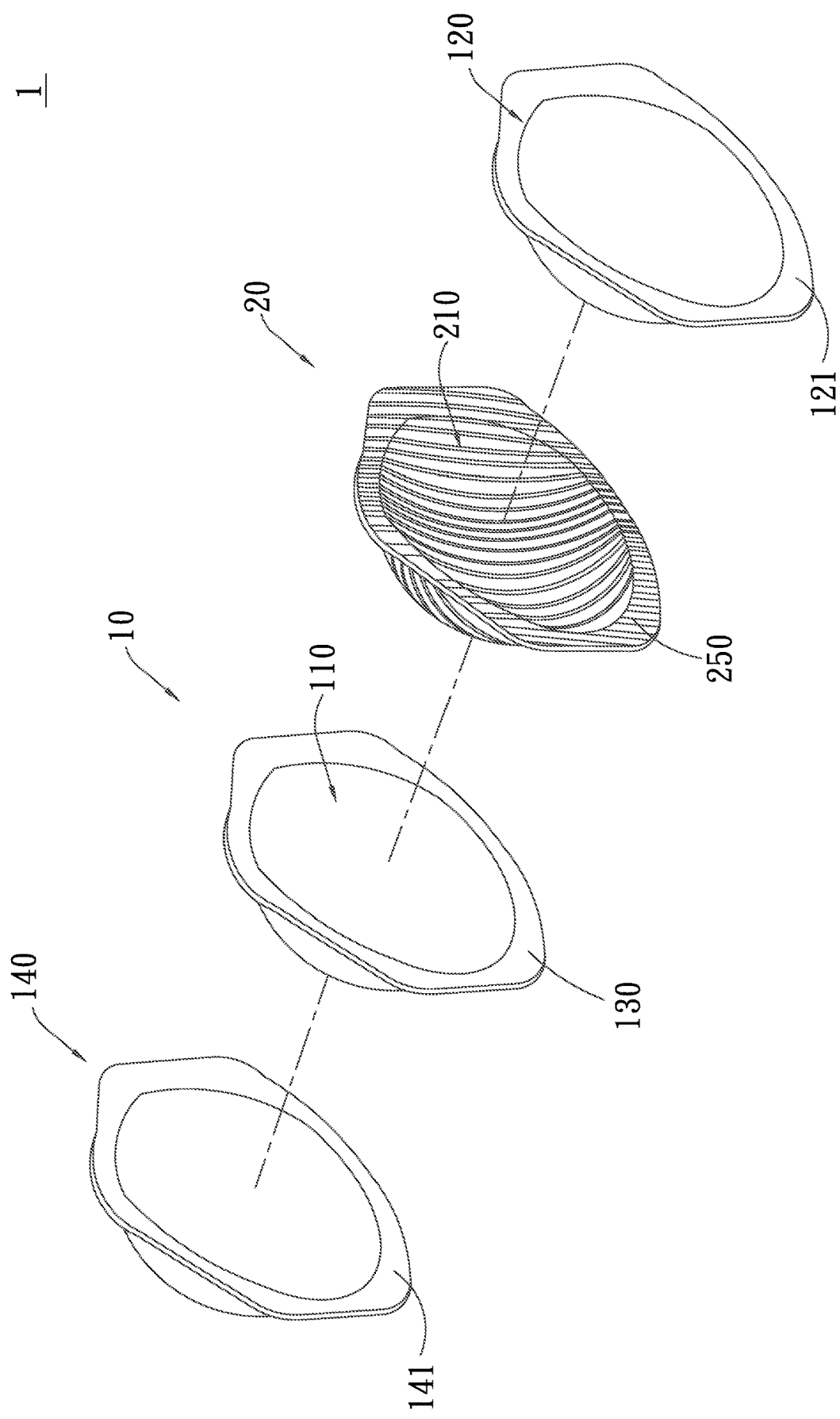
FIG. 7 is a schematic drawing showing the $8^{th}$ embodiment according to the present invention.

Refer to FIG. 7, the 8$^{th}$ embodiment is revealed. The difference between this embodiment and the above one is in that this embodiment of the filtering device 1 further includes a second shaping layer 120 and a protective layer 140. That is, this embodiment includes the first shaping layer 110 and the second shaping layer 120. The second shaping layer 120 is in the 3D shape. The shape of the second shaping layer 120 is corresponding to and matched the shape of the first shaping layer 110 of the mask body 10 and the pleated layer 20. The second shaping layer 120 is disposed on an inner side of the pleated layer 20 while the first shaping layer 110 is disposed on an outer side of the pleated layer 20. The pleated layer 20 is set between the first shaping layer 110 and the second shaping layer 120 while the second shaping layer 120 and the first shaping layer 110 are spaced apart from each other. Thus the shape of the pleated layer 20 is fixed by the first shaping layer 110 and the second shaping layer 120 and the deformation of the pleated layer 20 can be avoided. As to the protective layer 140, it is set on an outer side of the first shaping layer 110 of the mask body 10 and is spaced apart from the pleated layer 20 so as to protect the mask body 10 and prevent contaminants from attaching to the mask body 10. In this embodiment, the protective layer 140 is also in the 3D shape that is corresponding to and matched the shape of the mask body 10. The first shaping layer 110, the second shaping layer 120, the protective layer 140 and the pleated layer 20 can be produced simultaneously or respectively.

Figure 8:
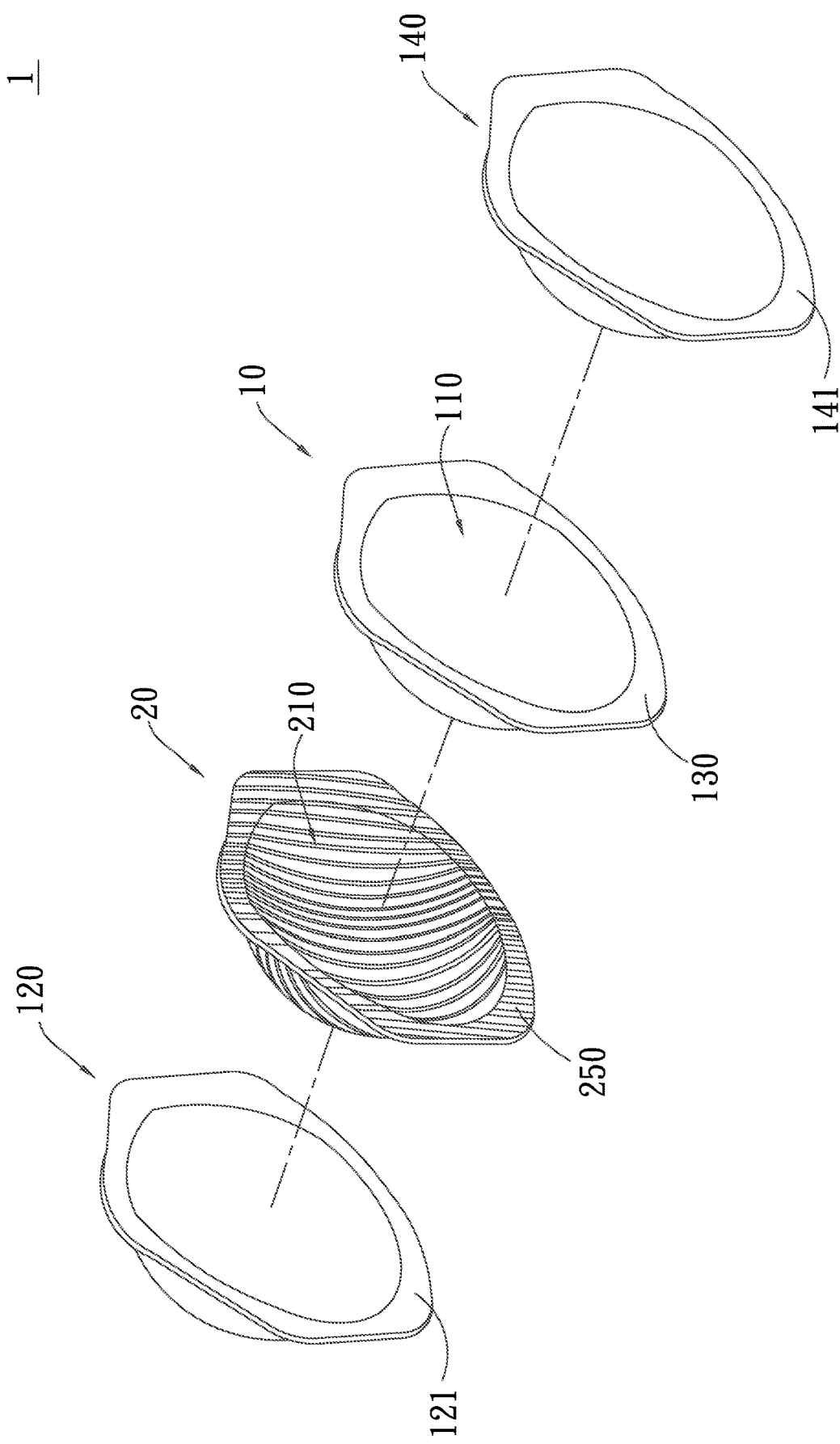
FIG. 8 is a schematic drawing showing the $9^{th}$ embodiment according to the present invention.

Refer to FIG. 8, the 9$^{th}$ embodiment is revealed. The difference between this embodiment and the above embodiment is in that the position of the mask body 10 and the position of the pleated layer 20 are exchanged. The pleated layer 20 is disposed on an outer side of the mask body 10 while the second shaping layer 120 is disposed on an outer side of the pleated layer 20 and is spaced apart from the first shaping layer 110 of the mask body 10. The protective layer 140 is set on an inner side of the first shaping layer 110 and is spaced apart from the pleated layer 20. Refer to the embodiments shown in FIG. 7 and FIG. 8, it is learned that the positions of the second shaping layer 120 and the protective layer 140 are changed along with the positions of the mask body 10 and the pleated layer 20 for covering and protecting the pleated layer 20 and the mask body 10 respectively. The deformation of both the pleated layer 20 and the pleats 210 is further avoided so that the shape of the pleated layer 20 and the pleats 210 is maintained.

Moreover, the circumference of the second shaping layer 120 of the 8$^{th}$ and the 9$^{th}$ embodiments is disposed with a second connection portion 121. The second connection portion 121 of the second shaping layer 120 can be connected to the shaping portion 250 of the pleated layer 20 and/or the first connection portion 130 of the mask body 10 so as to form the filtering device 1. The protective layer 140 of the 8$^{th}$ and the 9$^{th}$ embodiments includes a third connection portion 141 set around the protective layer 140. The third connection portion 141 of the protective layer 140 can be connected to the first connection portion 130 of the mask body 10, the shaping portion 250 of the pleated layer 20 and/or the second connection portion 121 of the second shaping layer 120 so as to form the filtering device 1.

Figure 9:
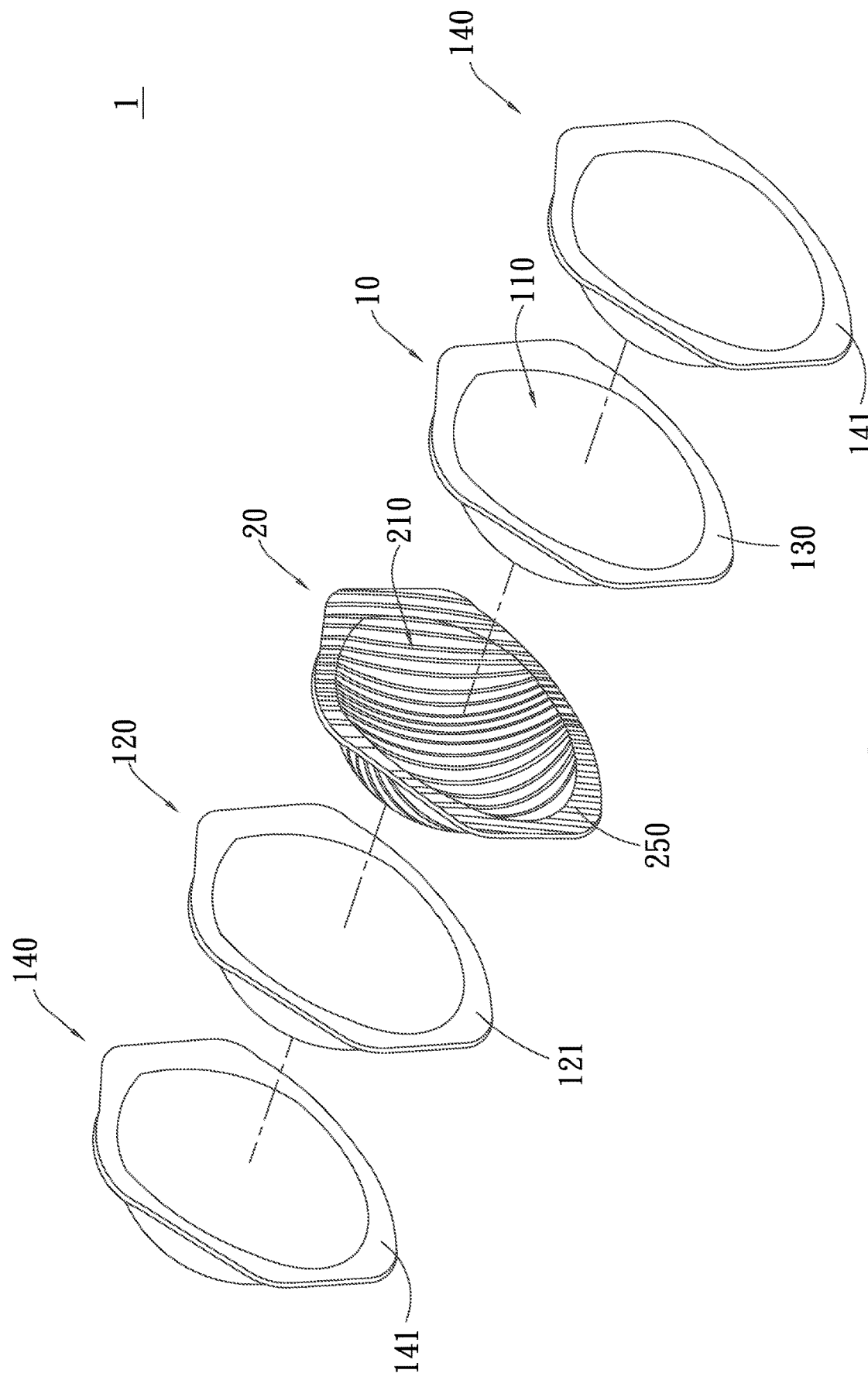
FIG. 9 is a schematic drawing showing the $10^{th}$ embodiment according to the present invention.

Refer to FIG. 9, the 10$^{th}$ embodiment is disclosed. The difference between this embodiment and the above embodiment is in that this embodiment includes two protective layers 140 that are disposed on an inner side of the first shaping layer 110 of the mask body 10 and an outer side of the second shaping layer 120 of the mask body 10 respectively so as to cover the first shaping layer 110 and the second shaping layer 120 respectively. Thus the pleated layer 20 is further covered by the protective layers 140. The first connection portion 130 of the first shaping layer 110 and the second connection portion 121 of the second shaping layer 120 are connected to the two third connection portions 141 of the protective layer 140 respectively so as to form the filtering device 1.

Figure 10:
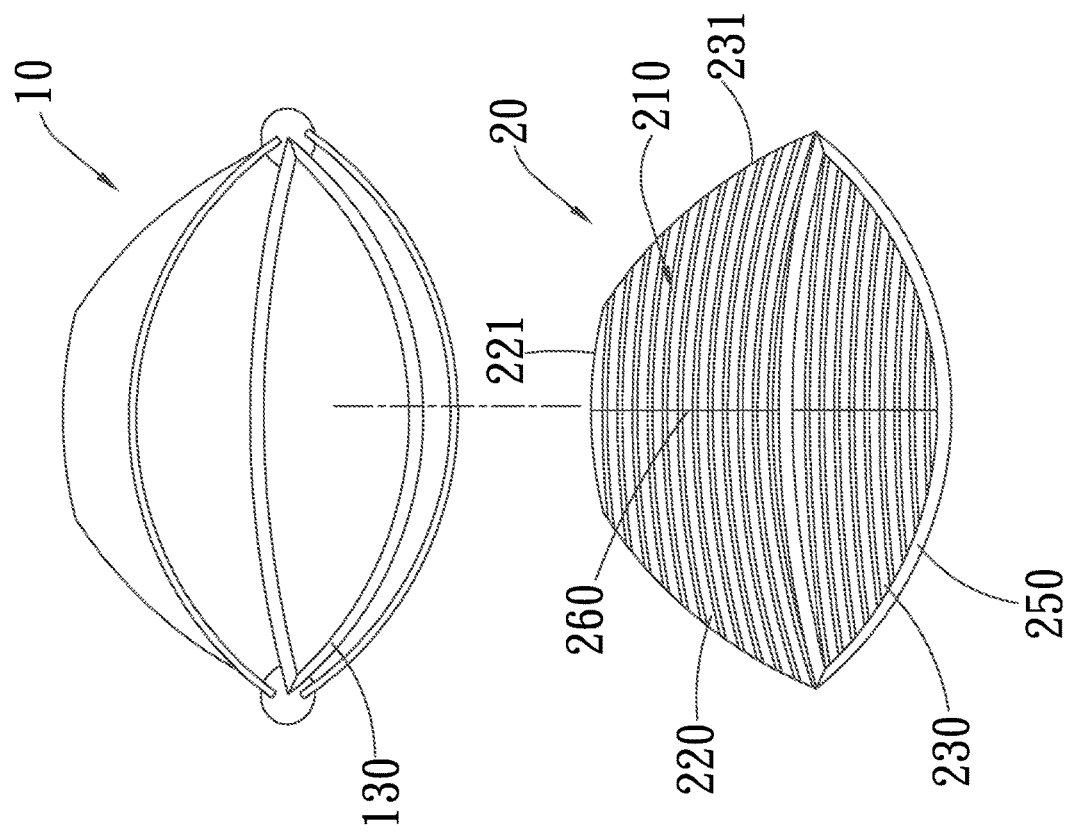
FIG. 10 is a schematic drawing showing the $11^{th}$ embodiment according to the present invention.
Figure 11:
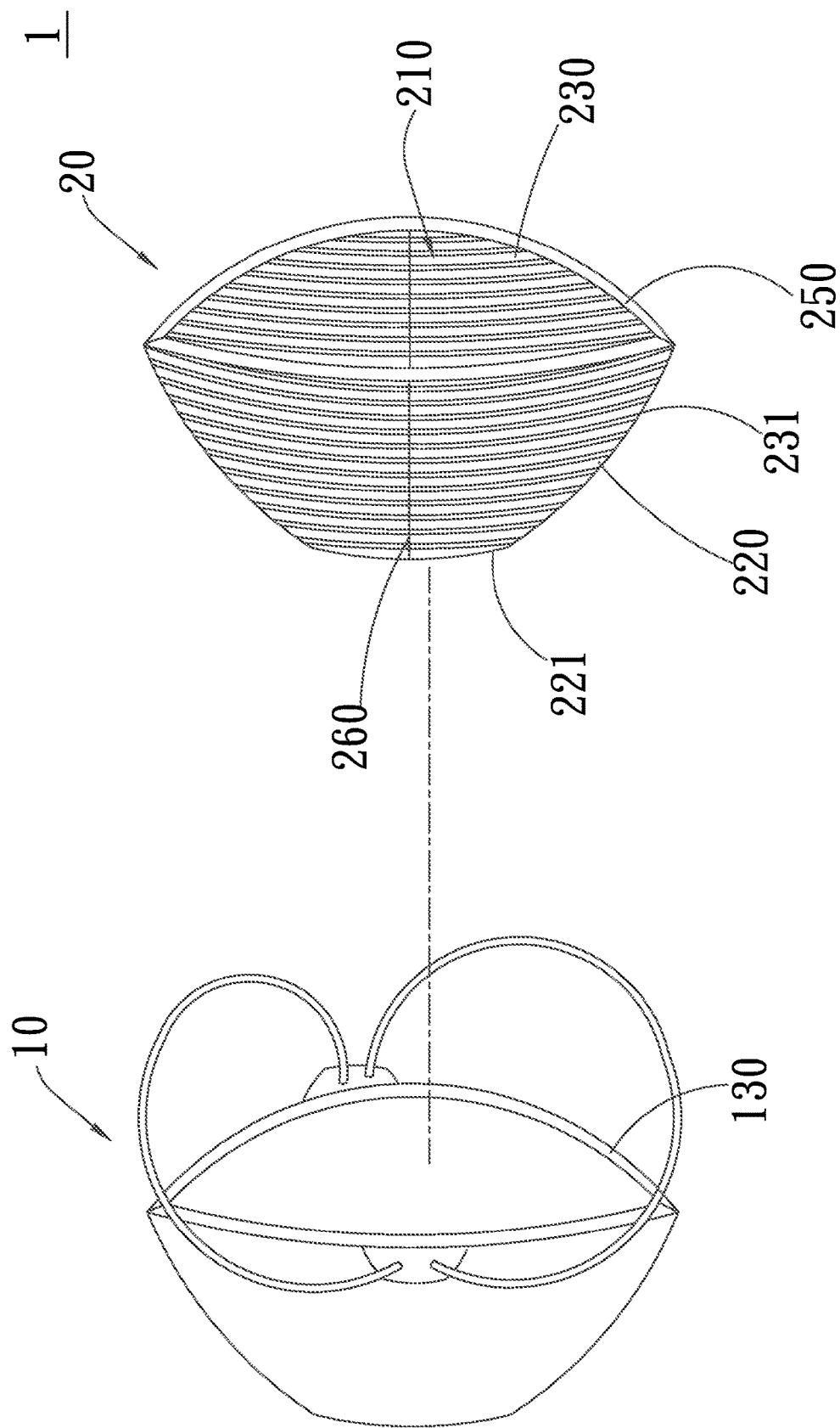
FIG. 11 is a schematic drawing showing the $12^{th}$ embodiment according to the present invention.

Refer to FIG. 10, the 11$^{th}$ embodiment is disclosed. The difference between this embodiment and the above embodiment is in that the shape of the mask body 10 of this embodiment looks like a duck bill while the to mask body 10 of the above embodiment is cup-shaped. The pleated layer 20 is also shaped like the duck bill. The shape of the filtering device 1 of the present invention can be various such as the mask in a vertical fold flat style (as shown in FIG. 11), the mask with a flat fold 3-panel design, etc.

In the 11$^{th}$ embodiment, the pleated layer 20 includes a first pleated sheet 220 and a second pleated sheet 230 stacked with each other vertically. A first joining edge 221 of the first pleated sheet 220 and a second joining edge 231 of the second pleated sheet 230 are connected to each other. In this embodiment, the first joining edge 221 is located on the left and right edges of the first pleated sheet 220 while the second joining edge 231 is located on the left and right edges of the second pleated sheet 230. Both the first pleated sheet 220 and the second pleated sheet 230 are arranged with the pleats 210 and a second shaping portion 260 respectively. The difference between the second shaping portion 260 of this embodiment and the shaping portion 250 mentioned above is in that the second shaping portion 260 of this embodiment is disposed on the pleats 210 located within the circumference of the first pleated sheet 220 or the pleats 210 located within the circumference of the second pleated sheet 230 and used for connecting the pleats 210 of the first pleated sheet 220 or the pleats 210 of the second pleated sheet 230 so as to fix the pleats 210 and prevent deformation of the pleats 210. The pleats 210 are rolling pressed or directly pressed with the energy of ultrasonic waves, gravity or heat to form the second shaping portion 260. The pleats 210 can also be connected by glue or machine sewing so as to form the second shaping portion 260.

Figure 12:
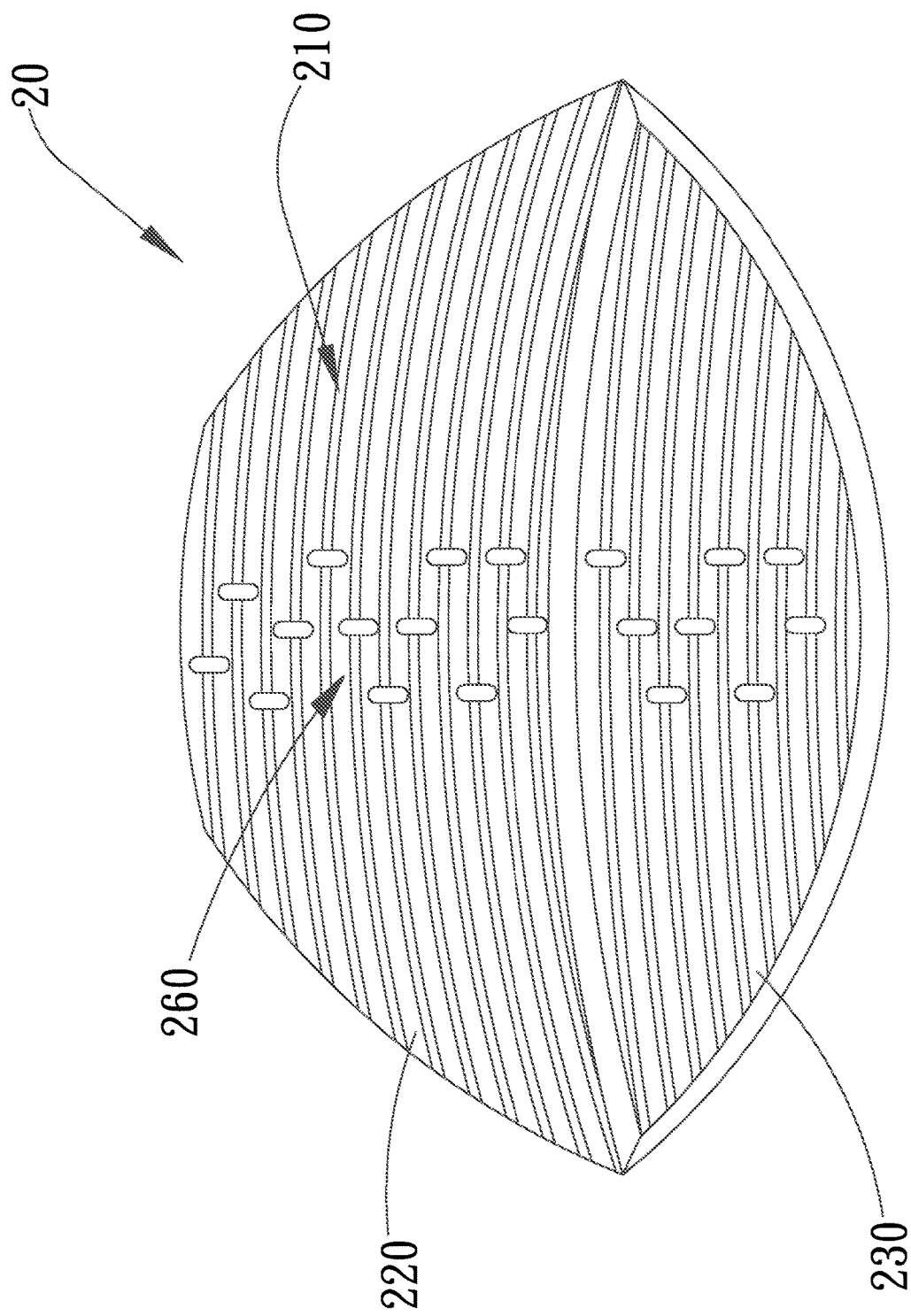
FIG. 12 is a schematic drawing showing a pleated layer of the $13^{th}$ embodiment according to the present invention.
Figure 13:
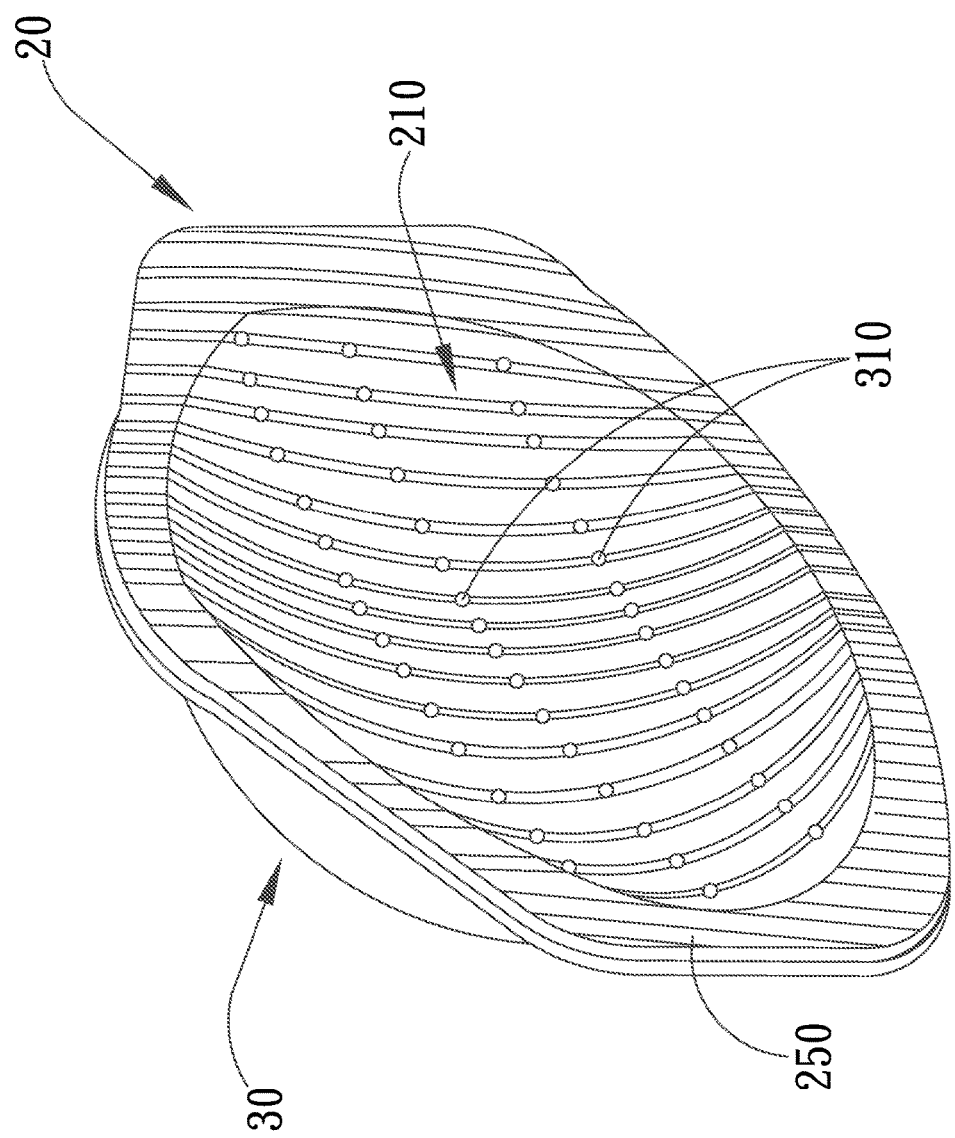
FIG. 13 is a schematic drawing showing a pleated layer of the $14^{th}$ embodiment according to the present invention.
Figure 14:
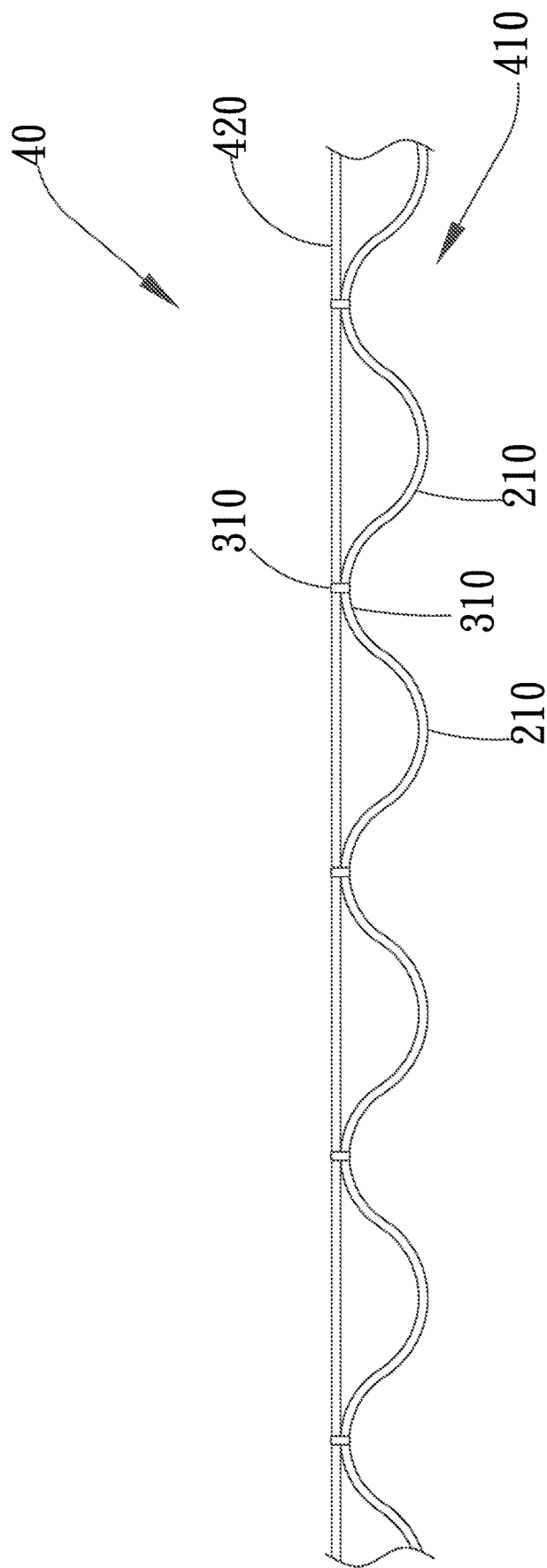
FIG. 14 is a schematic drawing showing a pleated fabric of the 14th embodiment according to the present invention.
Figure 15:
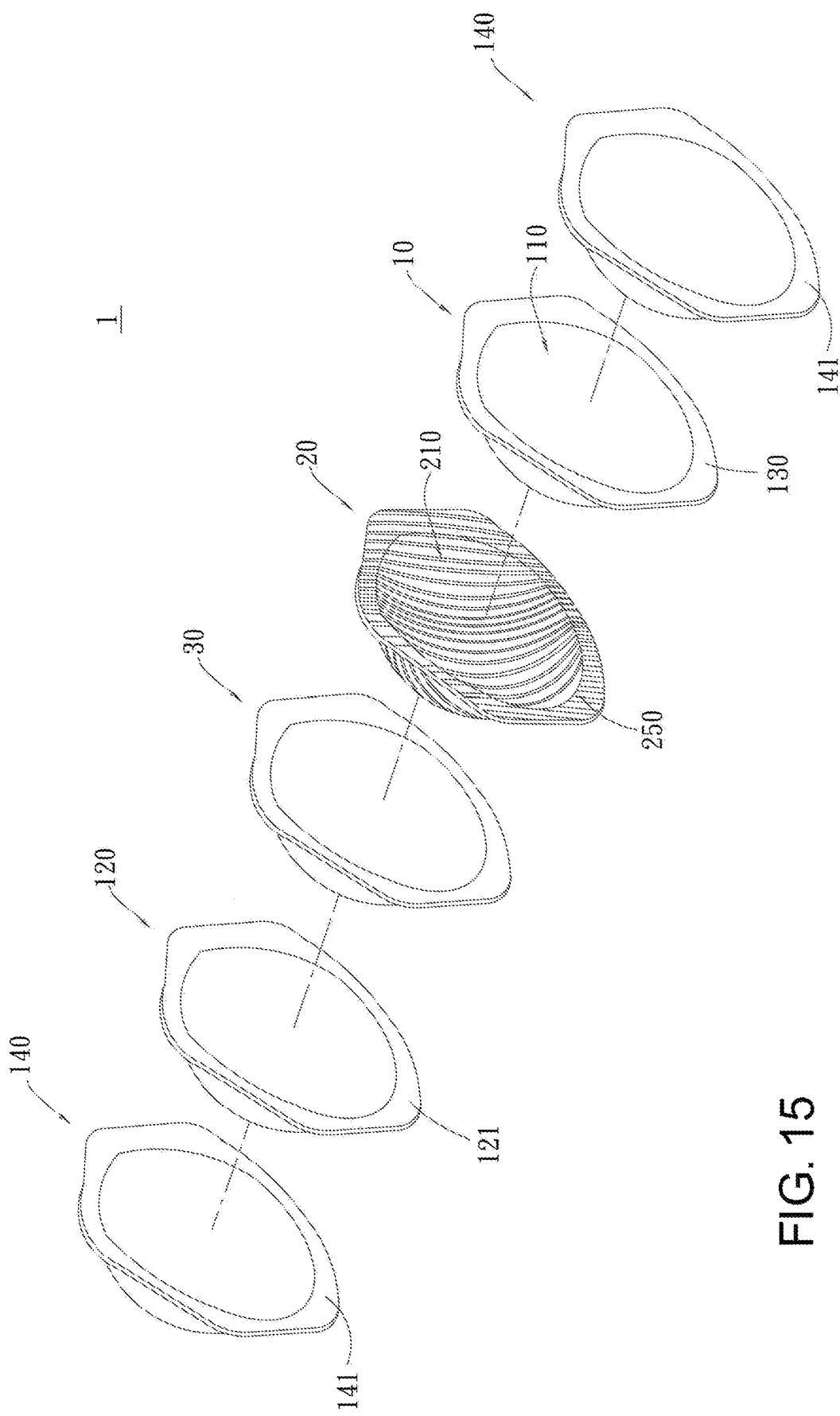
FIG. 15 is a schematic drawing showing the 14th embodiment according to the present invention.
Figure 16:
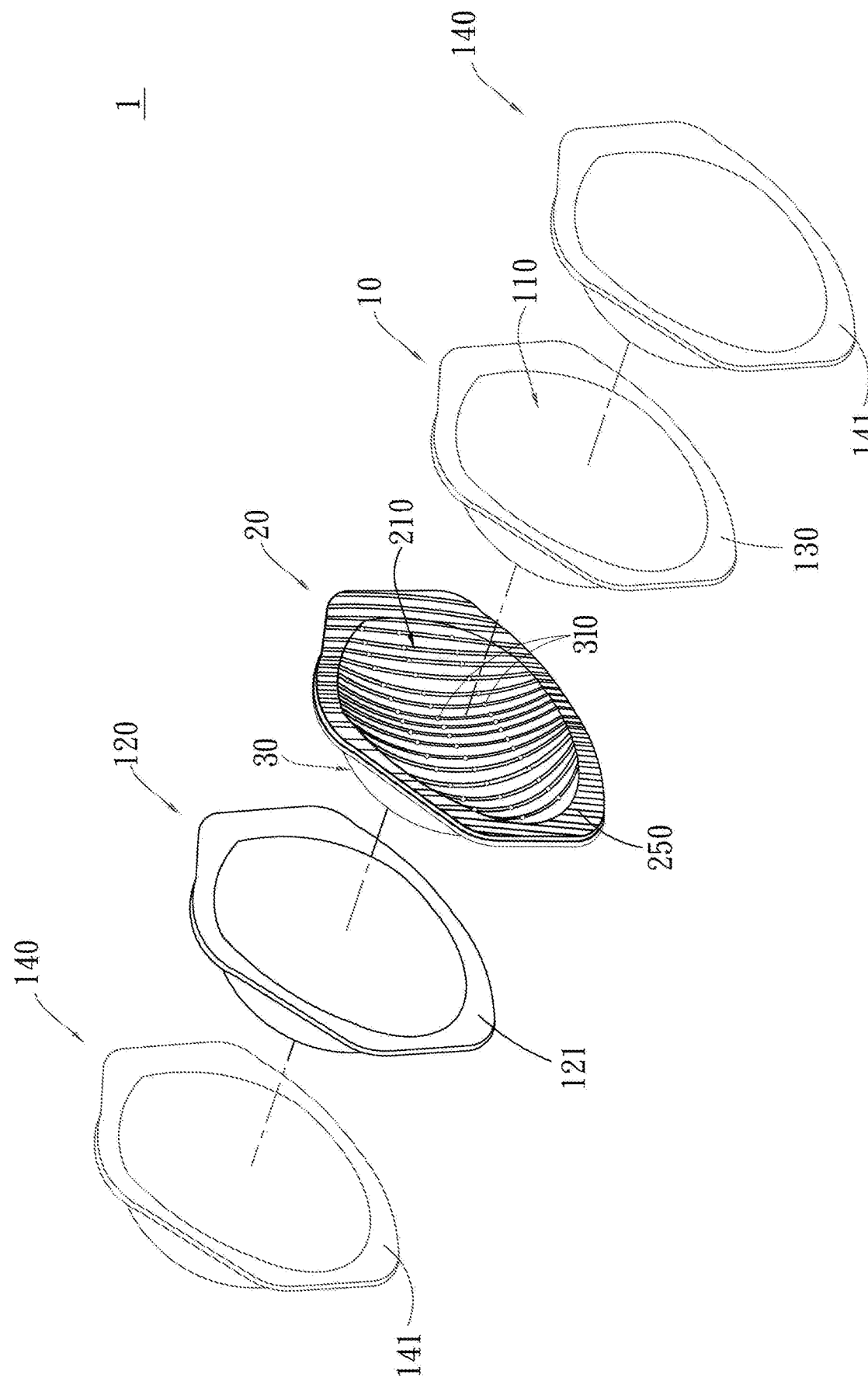
FIG. 16 is a schematic drawing showing the 14th embodiment according to the present invention.

Furthermore, the pleats 210 are formed only on the pleated layer 20, not the mask body 10. Thus the pleats 210 will not get deformed along with the deformation of the mask body 10 when the user wears the filtering device 1 and the mask body 10 is deformed. In this embodiment, the second shaping portion 260 is a linear binder. As shown in FIG. 12, a plurality of second shaping portions 260 are formed on the pleats 210. Each second shaping portion 260 can also be a pressed point that connects only the adjacent pleats 210. The difference between the second shaping portion 260 of this embodiment and the second shaping portion 260 of the above embodiment is in that the second shaping portion 260 of this embodiment only connects a part of the pleats 210 and the second shaping portions 260 are arranged in an irregular way. The second shaping portions 260 can also be disposed linearly as long as they can fix the pleats 210 firmly. Thus the deformation of the pleats 210 can be avoided and the filter effect of the filtering device 1 will not be affected by the deformed pleats 210. The second shaping portions 260 of the $11^{th}$, $12^{th}$, and $13^{th}$ embodiments can also be applied to other embodiments.

In addition, the mask body 10 and the pleated layer 20 of this embodiment include the first connection portion 130 and the shaping portion 250 respectively. When the pleated layer 20 is set over the mask body 10, the first connection portion 130 and the shaping portion 250 are matched and connected to each other so as to form the filtering device 1 shaped like the duck bill. The first connection portion 130 and the shaping portion 250 of this embodiments are different from those of the $1^{st}$ embodiment in that the first connection portion 130 and the shaping portion 250 of this embodiment are not protrudent edges toward the outer side of the mask body 10.

Refer to FIGS. 13-16, a pleated layer and pleated fabric of the $14^{th}$ embodiment are revealed. As shown in figures, the filtering device 1 of this embodiment includes a fixing layer 30 and a pleated layer 20 disposed on the fixing layer 30. At least one connection portion 310 is formed between the fixing layer 30 and the pleats 210 located within the circumference of the pleated layer 20. The connection portion 310 is used to connect the fixing layer 30 and the pleated layer 20. The fixing layer 30 can also be set on an inner side of the pleated layer 20. Both the fixing layer 30 and the pleated layer 20 are in 3D shape and are formed by pressing the pleated fabric 40. The pleated fabric 40 includes a pleated sheet 410 and a fixing sheet 420. The pleated sheet 410 of this embodiment is the same as the pleated sheet of the above embodiment, formed by at least one formed sheet being pleated. Thus the pleated sheet 410 with a plurality of pleats 210 is produced. The fixing sheet 420 is set over and rolling pressed or directly pressed with energy of ultrasonic waves, gravity or heat to be connected to the pleated sheet 410. The connection portion 310 is formed between the pleated sheet 410 and the fixing sheet 420, located on a depression 220 between two adjacent pleats 210. Thus the pleats 210 of the pleated sheet 410 are fixed on the fixing sheet 420 so as to form the pleated fabric 40. The pleats 210 of the pleated sheet 410 will not extend or distort. Thus the filter effect and air permeability of the filtering device 1 made from the pleated fabric 40 will not be reduced. The position of the connection portion 310 on the pleats 210 of the pleated sheet 410 is not limited to the depression 220 between the two pleats 210, able to be modified according to settings of the production processes.

At last, the pleated fabric 40 is placed into a 3D mold and is rolling pressed or directly pressed with energy of ultrasonic waves, gravity or heat to form the 3D filtering device 1. The 3D fixing layer 30 and the 3D pleated layer 20 are formed at the same time while a shaping portion 250 is formed around both the fixing layer 30 and the pleated layer 20. The fixing layer 30 of the filtering device 1 in this embodiment is used to fix the pleats 210 of the pleated layer 20, protect the surface of the pleated layer 20, and maintain the shape of the pleated layer 20 in the 3D form. The fixing layer 30 provides functions of both the shaping layer and the second shaping portions on the pleated layer of the above embodiment. Thus the filtering device 1 of this embodiment has a simpler structure and the production processes of the filtering device 1 can be simplified. The pleated fabric 40 of this embodiment can also be applied to the pleated layer of the above embodiments. For example, the pleated layer 20 of the $2^{nd}$ embodiment can be produced by pressing two pieces of the pleated fabric 40. The edge of each piece of the pleated fabric 40 is used as the joining edge and the pieces of the pleated fabric 40 are connected to each other by the joining edges. Similarly, four pieces of the pleated fabric 40 are pressed and connected to each other to form the $7^{th}$ embodiment. The shaping layer or the protective layer of the above embodiments can also be applied to the present embodiment.

In summary, the filtering device of the present invention includes a pleated layer set on a mask body. The surface area of the pleated layer is larger than that of the mask body due to a plurality of pleats on the pleated layer. Thus the filtration area of the filtering device is effectively increased and the filter effect is further improved. Not only the pressure difference across the filtering device is reduced, the air permeability and the wearing comfort of the filtering device are also increased. Moreover, the pleated layer is in the 3D shape and set on the mask body to avoid reduction of the air permeability caused by deformation of the pleats of the pleated layer. The pleated layer further includes a shaping portion used for fixing the pleats of the pleated layer and preventing deformation of the pleats. Thus the air permeability will not be reduced. A fixing layer is disposed on the surface of the pleated layer and the pleats of the pleated layer are connected to the fixing layer by connection portions. The shaping layer, the protective layer and the second shaping portion can be omitted for simplifying the structure of the filtering device and the production method.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:
1. A filtering device comprising:
a mask body being three-dimensional;
a fixing layer being three-dimensional and disposed on the mask body; and
a pleated layer being three-dimensional and disposed on the fixing layer; wherein the pleated layer includes a plurality of pleats; a surface area of the pleated layer is larger than a surface area of the mask body; at least one connection portion is formed between the fixing layer and the pleats located within the circumference of the pleated layer; the pleated layer is fixed on the fixing layer; the pleats are fixed on the fixing layer by the connection portion; the pleated layer includes a plurality of pleated sheets; a shape of each of the pleated sheets is a part of a shape of the pleated layer; each of the pleated sheets includes the pleats, and at least one arcuate pressed joining-edge of each of the pleated sheets formed intermediate of a periphery of the pleated layer; the arcuate pressed joining-edge of each of the pleated sheets is connected to the arcuate pressed joining-edge of an adjacent pleated sheet to form a substantially curvilinear contour between the adjacent sheets in forming the pleated layer whereby said adjacent sheets are only press joined at the arcuate pressed joining-edges to avoid deformation of the associated pleats when each of said pleated sheets are pressed joined to an adjacent pleated sheet along a common joining-edge.

2. The filtering device as claimed in claim 1, wherein a shape of the pleats of the pleated layer is continuous waves, discontinuous waves, a zigzag form, or an irregular form; the pleated layer has electrostatic charges.

3. The filtering device as claimed in claim 1, wherein each of the pleated sheets includes at least one formed sheet.

4. The filtering device as claimed in claim 1, wherein at least a portion of the arcuate pressed joining-edge is curved or linear.

5. The filtering device as claimed in claim 1, wherein the shape of the pleated layer is corresponding to a shape of the mask body; the mask body includes a first shaping layer and the fixing layer is disposed on one side of the first shaping layer.

6. The filtering device as claimed in claim 5, further comprising a protective layer disposed on the other side of the first shaping layer.

7. The filtering device as claimed in claim 5, further comprising a second shaping layer disposed on one side of the pleated layer.

8. The filtering device as claimed in claim 1, wherein the pleated layer includes at least one formed sheet.

9. The filtering device as claimed in claim 1, wherein a first connection portion is disposed around the mask body while a shaping portion is disposed around the pleated layer; the first connection portion and the shaping portion are connected to each other.

10. The filtering device as claimed in claim 9, further comprising a shaping layer disposed on the pleated layer; wherein a second connection portion is disposed around the shaping layer; the second connection portion is connected to the first connection portion and/or the shaping portion.

11. The filtering device as claimed in claim 9, further comprising at least one protective layer; wherein a third connection portion is disposed around the protective layer; the third connection portion is connected to the first connection portion and/or the shaping portion.

12. The filtering device as claimed in claim 1, wherein the pleated layer further includes at least one shaping portion disposed on the pleats located within the circumference of the pleated layer and used for fixing the pleats.

13. The filtering device as claimed in claim 1, wherein the circumference of the fixing layer and the circumference of the pleated layer are stacked on each other.

14. A filtering device comprising:
a mask body; and
a pleated layer disposed on the mask body and having a plurality of pleats and a shaping portion; wherein the shaping portion is disposed around the pleated layer for fixing the pleats; a surface area of the pleated layer is larger than a surface area of the mask body; the pleated layer includes:
a plurality of pleated sheets having the pleats respectively; each of the pleated sheets including at least one arcuate pressed joining-edge of each of the pleated sheets formed intermediate a contour of the periphery of a peripheral edge of the pleated layer; wherein a shape of each of the pleated sheets is a part of a shape of the pleated layer; the arcuate pressed joining-edge of each of the pleated sheets is connected to the arcuate pressed joining-edge of an adjacent pleated sheet to form a substantially curvilinear contour between the adjacent sheets in forming the pleated layer whereby said adjacent sheets are only press joined at the arcuate pressed joining-edges to avoid deformation of the associated pleats when each of said pleated sheets are pressed joined to an adjacent pleated sheet along a common joining-edge.

15. A filtering device comprising:
a pleated layer being three-dimensional, having a plurality of pleats; wherein a plurality of shaping portions are formed by a part of the pleats to fix the pleats; the shaping portions are formed on the pleats, each of the shaping portions connects with only adjacent pleats at a plurality of fixing sections which are linearly positioned each with respect to one another along said pleated layer.

16. The filtering device as claimed in claim 15, wherein the pleated layer is produced from a pressed pleated-fabric.

17. The filtering device as claimed in claim 16, wherein the pleated fabric includes:
a pleated sheet having the pleats; and
a fixing sheet disposed on the pleated sheet;
wherein at least one connection portion is formed between the fixing sheet and the pleats located within the circumference of the pleated sheet; the fixing sheet is used for fixing the pleats.

18. The filtering device as claimed in claim 15, wherein the pleated layer is produced from at least two pieces of pleated fabric; each piece of the pleated fabric includes at least one pressed joining-edge formed intermediate a contour of the periphery of a peripheral edge of the pleated fabric; the pressed joining-edge of the pleated fabric is connected to the pressed joining-edge of an adjacent pleated fabric to form a substantially co-planar section between the adjacent sheets.

19. The filtering device as claimed in claim 18, wherein the pleated fabric includes:
a pleated sheet having the pleats; and
a fixing sheet disposed on the pleated sheet;
wherein at least one connection portion is formed between the fixing sheet and the pleats located within the circumference of the pleated sheet; the fixing sheet is used for fixing the pleats.

20. A filtering device comprising:
a fixing layer; and
a pleated layer being three-dimensional, disposed on the fixing layer, having a plurality of pleats; wherein a plurality of shaping portions are made of a part of the pleats to fix the pleats on the fixing layer, the shaping portions are formed on the pleats, each of the shaping portions connects with only adjacent pleats at a plurality of fixing sections which are linearly positioned each with respect to one another along said pleated layer.

* * * * *